(12) United States Patent
Bae et al.

(10) Patent No.: US 8,961,314 B2
(45) Date of Patent: Feb. 24, 2015

(54) DEVICE FOR PROVIDING VIRTUAL CLIENT MANAGING MODULE, APPARATUS FOR MANAGING VIRTUAL CLIENT, AND METHOD FOR TESTING A GAME BY USING VIRTUAL CLIENT MANAGING MODULE

(75) Inventors: Su-Young Bae, Daejeon (KR); Kang-Min Sohn, Daejeon (KR); Chang-Joon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1109 days.

(21) Appl. No.: 12/939,337

(22) Filed: Nov. 4, 2010

(65) Prior Publication Data
US 2011/0151954 A1 Jun. 23, 2011

(30) Foreign Application Priority Data

Dec. 18, 2009 (KR) .................. 10-2009-0126714
Apr. 19, 2010 (KR) .................. 10-2010-0035905

(51) Int. Cl.
| | | |
|---|---|---|
| G06F 17/00 | (2006.01) | |
| A63F 13/30 | (2014.01) | |
| G06F 9/44 | (2006.01) | |
| G06F 15/177 | (2006.01) | |

(52) U.S. Cl.
CPC ........... *A63F 13/12* (2013.01); *A63F 2300/534* (2013.01); *A63F 2300/535* (2013.01); *A63F 2300/538* (2013.01); *A63F 2300/5593* (2013.01)
USPC .............................. 463/42; 709/221; 717/106

(58) Field of Classification Search
None
See application file for complete search history.

(56) References Cited

U.S. PATENT DOCUMENTS

| | | | | |
|---|---|---|---|---|
| 5,671,415 | A * | 9/1997 | Hossain | 717/101 |
| 5,754,755 | A * | 5/1998 | Smith, Jr. | 714/38.1 |
| 6,260,065 | B1 * | 7/2001 | Leiba et al. | 709/224 |
| 2003/0149958 | A1 * | 8/2003 | Baluja et al. | 717/106 |
| 2005/0170891 | A1 * | 8/2005 | Shim et al. | 463/42 |
| 2007/0155494 | A1 * | 7/2007 | Wells et al. | 463/35 |
| 2010/0087255 | A1 * | 4/2010 | Kniberg et al. | 463/42 |
| 2010/0138813 | A1 * | 6/2010 | Kim et al. | 717/131 |

FOREIGN PATENT DOCUMENTS

| | | | |
|---|---|---|---|
| JP | 2008259869 A | * | 10/2008 |
| KR | 10-2005-0065200 A | | 6/2005 |
| KR | 1020090065747 A | | 6/2009 |

OTHER PUBLICATIONS

Su-Young Bae et al., "On-Line Game Server Load Testing Technology Using Virtual Users", Journal of Korea Information Science Society, 2009, pp. 36-44.

* cited by examiner

*Primary Examiner* — Wen-Tai Lin

(57) ABSTRACT

The present invention relates to a technology for easily generating and supplying a virtual client managing module specified for various games and testing the load and function of a game through a virtual client managing module and an apparatus for managing a virtual client. The device for managing a virtual client managing module according to the exemplary embodiment of the present invention performs a function that uses template specialized for each type of game as game unique information to generate a specialized module and generates the virtual client managing module combined with the common module. The apparatus for managing the virtual client generates and controls the virtual client based on the virtual client managing module.

20 Claims, 7 Drawing Sheets

DEVICE FOR PROVIDING VIRTUAL CLIENT MANAGING MODULE, APPARATUS FOR MANAGING VIRTUAL CLIENT, AND METHOD FOR TESTING A GAME BY USING VIRTUAL CLIENT MANAGING MODULE

CROSS REFERENCE TO RELATED APPLICATIONS

This application claims priority to Korean Patent Application No. 10-2009-0126714 filed on Dec. 18, 2009 and Korean Patent Application No. 10-2010-0035905 filed on Apr. 19, 2010, the entire contents of which are herein incorporated by reference.

BACKGROUND OF THE INVENTION

1. Field of the Invention

The present invention relates to a technology of managing a virtual client for testing the load and function of a game. More particularly, the present invention relates to a technology of effectively generating a virtual client capable of testing whether a simple network load of a game and various functions are smoothly performed, by generating the virtual client specialized to a specific game and test a game by applying the virtual client to the game as if a real user uses a game.

2. Description of the Related Art

An online game market is rapidly emerging. Since the online game market has rapidly grown popular, many users using the online game may simultaneously access one game. As a result, when a game is accessed, a game server goes down or inefficient management of a game occurs.

Further, expectations by users have gradually increased daily when using the online game. In order to meet the expectations of the users, the online game also has various and complex functions, which have been diversified for each kind of online game. For one online game to be successful in a market, the online game should include only the specialized functions and the functions performed in a game including the specialized functions should be operated smoothly.

Therefore, a online game company usually carries out a beta test for testing functions and loads of a server before being released. As the beta test, there are a closed beta test and an open beta test, etc. The beta test means a task performed to test problems or errors in a function of a game and a load according to the use of the game while the selected few persons or all Internet users test the uncompleted game.

However, in performing the beta test, many persons should participate in the beta test. Therefore, in order to provide more completed games and effectively perform the test for the game, a research on a technology to automatically test a game rather than a user performing the game test, has been conducted. A method for testing a load applied to a server and a method for generating a virtual client for a specific game and applying the generated virtual client to a game has been suggested.

Recently, a need for a game test technology that can be commonly applied to all the games by simply using only a small quantity of information specialized for a game has been increased. Further, a need for a game test technology capable of exhibiting an effect, for example, as if the person tests a game by testing various functions of a game as well as simply testing only the load of the game even though the person does not actually participate in the game test has also increased.

SUMMARY OF THE INVENTION

The present invention has been made in an effort to provide an apparatus and a method capable of automatically performing a test on a game by generating a module capable of generating and controlling a virtual client specialized for each game by receiving game unique information and using the generated module. In addition, it is another object of the present invention to provide an apparatus and a method performing a game test capable of performing a test on whether a load applied to a server by data packets generated according to performance of a game and a unique function of a game necessary to perform a game are smoothly performed in performing the test on the game.

An exemplary embodiment of the present invention provides a device for providing a virtual client module, including: a specialized module generating unit that generate an specialized module which expands a specialized template classified for each type of games by using game unique information; a common module providing unit that provides a common module including a functions common to a plurality of games; and a module combining unit that generates a virtual client managing module of the game by combining the specialized module and the common module.

The specialized template is expanded by the unique game information and includes at least one of a plurality of character templates classified for each type of game (for example, roll playing, shooting, one-dimensional shooting, adventure game, etc.) and a packet protocol template as packet related specialized templates generated according to the game execution.

The packet protocol template may include a template regarding at least one information among exchanging order of a packet exchanged between a game client and a game server, an packet exchanging information, the number of packets, and a configuration of the packets.

The common module may include at least one of a virtual client control module that is related with the generation and control of the virtual client, a network communication module that controls communication between the virtual client and the game server, and a scenario application module defining a series of behaviors of the virtual client.

Another exemplary embodiment of the present invention provides an apparatus for managing a virtual client, including: a virtual client managing module storing unit by receiving and storing a virtual client managing module generated by combining a common module including a function commonly applied to a plurality of games and a specialized module including functions specialized for each game; a virtual client controller that controls a virtual client based on the virtual client managing module; and a network communication unit that manages data packets exchanged between the plurality of virtual clients and between the virtual client and the game server of the specific game for excuting the game based on the virtual client managing module.

The network communication unit includes a packet generator that generates data packets including the information generated by executing the game; and a packet analyzer that analyzes the number and contents of data packets to generate at least one of the load in the network and the malfunction information in executing the game, in addition to a data communication unit that transmits and receives data packets.

The specialized module may include the character module and the packet protocol module for the specific game.

The common module may include at least one of the virtual client control module that is related to the generation and control of the virtual client, a network communication module that controls communication between the virtual client and the game server, and a scenario application module that defines a series of behaviors of the virtual client.

The virtual client exists in plural and is a subject that manages scenario information and character information corresponding to each virtual client according to the control of the controller of the virtual client.

The apparatus for managing a virtual client may further include a packet protocol managing unit that manages a protocol for the generation and control of the plurality of data packets.

Yet another exemplary embodiment of the present invention provides a method for testing a game by using a virtual client managing module, including: generating specialized module which expands a specialized template classified for each type of games by using game unique information by a specialized module generating unit; providing a common module including a function common to a plurality of games by a common module providing unit; and generating a virtual client managing module of the game by combining the specialized module and the common module by a module combining unit.

The specialized template may include at least one of a plurality of character templates and packet protocol templates classified for each type of game. The packet protocol template may include a template regarding at least one information among exchanging order of a packet exchanged between a game client and a game server, packet exchanging information, the number of packets, and a configuration of the packets.

The common module may include at least one of a virtual client control module that is related with the generation and control of the virtual client, a network communication module that controls communication between the virtual client and the game server, and a scenario application module defining a series of behaviors of the virtual client.

The method for testing a game by using a virtual client managing module may further include virtually executing and testing the game based on the virtual client managing module by the apparatus for managing the virtual client.

The testing may include controlling the virtual client based on the virtual client managing module by the virtual client controller.

The controlling of the virtual client may be performing at least one of the generation, removal, and control of the virtual client based on at least one of the virtual client control module, the character module, the packet protocol module, and the scenario application module.

The virtual client exists in plural and is a subject that manages scenario information and character information corresponding to each virtual client by using the scenario application module and the character module.

The testing may include managing data packets exchanged between the plurality of virtual clients and between the virtual client and the game server of the game for executing the game based on the virtual client managing module by the network communication unit.

The managing the data packets may include generating data packets including the information generated by executing the game by the packet generator; and analyzing the number and contents of data packets by the packet analyzer to generate at least one of the load in the network and the malfunction information when executing the game.

According to the embodiments of the present invention, it separates commonly applied matters for each game from matters specifically applied for each game to generate the virtual client managing module, thereby making it possible to easily manage the virtual client in all the games. Therefore, the present invention does not have to individually generate the apparatus for managing the virtual client each time the game to be tested is added and can build the system for managing the virtual client specialized for the game by inputting only the game unique information. In addition, the present invention can test the function, graphic, and communication problems occurring while executing the game in addition to the simple load test, thereby making it possible to automatically performing the comprehensive test of the game.

DETAILED DESCRIPTION OF THE PREFERRED EMBODIMENTS

Hereinafter, a device for providing a virtual client managing module, an apparatus for managing the virtual client, and a method for testing a game by using a virtual client managing module according to an exemplary embodiment of the present invention will be described with reference to the accompanying drawings.

Figure 1:
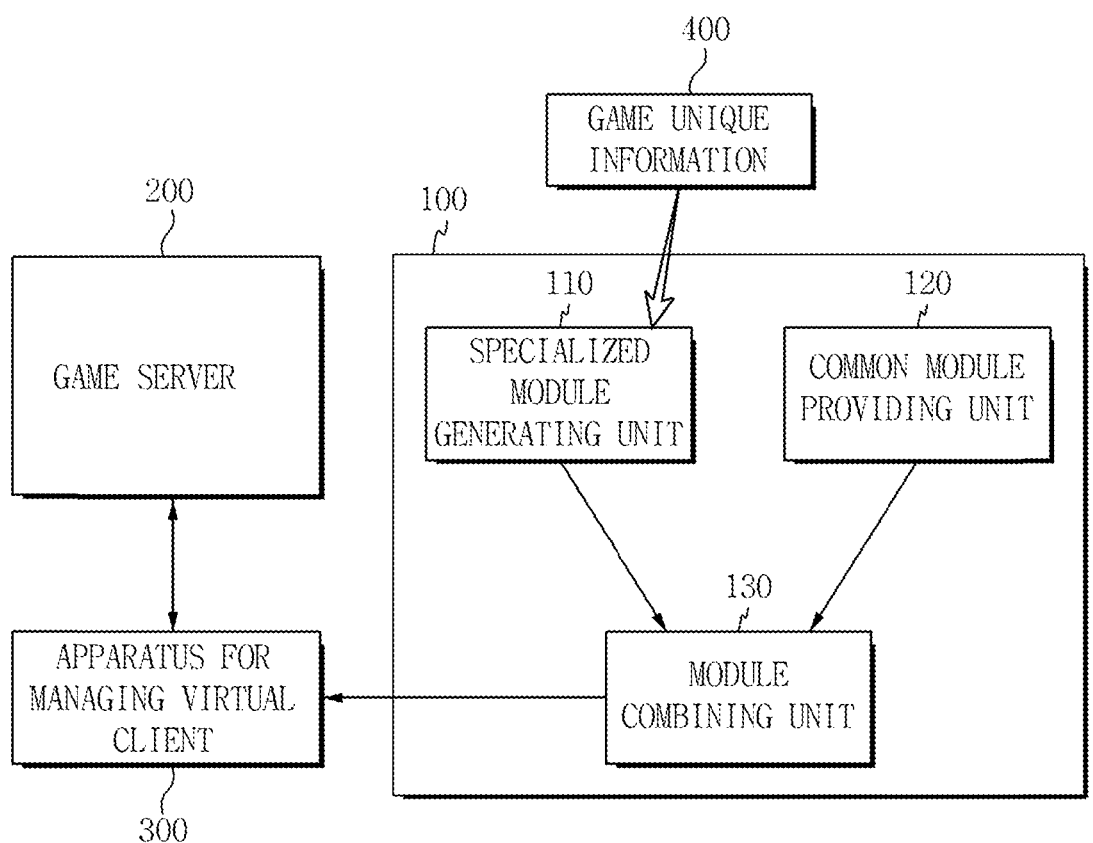
FIG. 1 is a diagram showing a device for providing a virtual client managing module according to an exemplary embodiment of the present invention.

FIG. 1 is a diagram showing a device 100 for providing a virtual client managing module according to an exemplary embodiment of the present invention.

Referring to FIG. 1, a device for providing a virtual client managing module according to an exemplary embodiment of the present invention includes a specialized module generating unit 110, a common module providing unit 120, and a module combining unit 130. The module combining unit 130 is connected to an apparatus 300 for managing a virtual client through wired or wireless communication and the apparatus 300 for managing the virtual client is connected to a game server 200. The apparatus 300 for managing the virtual client may be included in the game server 200.

The specialized module generating unit 110 serves to generate a specialized module expanding a specialized template classified for each type of game by using game unique information 400.

A data specialized for each game can be reflected to generate a virtual client specialized for each game and to test a game. Therefore, a unit that separates functions having different information for each game and receives information corresponding to the functions, and implement functions according to the received information is required.

In order to implement the above-method functions, the specialized module generating unit 110 receives information on functions specialized for each game and expands the previously allocated templates to be able to perform functions specialized for each game, thereby generating the specialized modules.

In the exemplary embodiment of the present invention, the specialized templates may include a plurality of character templates classified for each type of games.

The character template means a template extensible to generate various characters of a game having different characteristics for a type of game based on the type of game. For example, an airplane shooting game among two-dimensional shooting games will be described. The information on characters according to a type of game may include information on characteristics such as a name, type, weapon, and item of a character, a moving speed according to characters, etc.

Therefore, the character template may provide the template capable of storing the plurality of information. If the unique information 400 on the game corresponding to the plurality of information as the unique information 400 on the game is received, the character template is expanded to modularize characters such that the apparatus 300 for managing the virtual client uses the modularized characters, thereby making it possible to generate and control characters by the virtual client.

A packet protocol template specialized for a game may be included in the specialized template.

The packet protocol template means a template capable of applying protocols for data packets specialized for a game. The packet protocol of the game means a protocol for the data packet communicated between the game server and the client.

The packet protocol template means a template that can represent information about an exchanging order of the packet communicated between the client of the game and the game server 200, the information on the packet exchange information (such as type, size, and time of exchanging etc.) exchanged between the game server 200 and the client during a predetermined period or periodically, the number of general packets for playing a game, and information on the configuration of the packet to represent what field configures each packet.

Since the information on the above-mentioned plurality of packets may be varied according to the kind of game and the game server 200, the matters corresponding to the information related to the above-mentioned packet protocol template may be included in the unique information 400 on the game to be input and the template may be expanded based on the unique information 400 on the input game.

The specialized module generating unit 110 receives the unique information 400 corresponding to the specialized template from the game server or the game manager to expand the specialized template to the specialized module and to transmit it to the module combining unit 130.

The common module providing unit 120 serves to provide the common module including the function common to the plurality of games to the module combining unit 130.

The common module means a module including the operation of the game and the general information necessary to enable the virtual client to perform the game like a real user.

In the exemplary embodiment of the present invention, the common module may include at least one of a virtual client control module related to the generation and control of the virtual client, a network communication module controlling communication between the virtual client and the game server or between the virtual clients, and a scenario application module defining a series of behaviors of the virtual client.

The virtual client control module which is a module to generate and control the virtual client is a main module of the virtual client managing module. The virtual client control module is a module that performs a function to generate the virtual client and controls the behavior by connecting the specialized module, the scenario application module, and the network communication module.

The network communication module performs the network communication management in simultaneously generating the plurality of virtual game clients and a socket management to communicate between each of the plurality of virtual clients and the game server 200. In addition, the network communication module may perform a function of testing a game by determining an amount of load applied to the game server 200.

The scenario application module defines, as a scenario, the behaviors of various virtual clients such as a moving path set up with characters, event reception and execution command generation, and the next behavior performance of the characters. The scenario application module receives the information on the game specialization module to perform a function defining a scenario.

The common module providing unit 120 performs a function of storing the above-mentioned common module and then, providing the common module to the module combining unit 130 when the generation of the virtual client managing module is needed.

The module combining unit 130 receives the specialized module from the specialized module generating unit 110 and receives the common module from the common module providing unit 120. Thereafter, the module combining unit 130 performs a function of generating the virtual client managing module of the game by combining the specialized module and the common module.

The module combining unit 130 transmits the virtual client managing module in a package type where the separately existing specialized module and common module are combined to the apparatus 300 for managing the virtual client.

Figure 2:
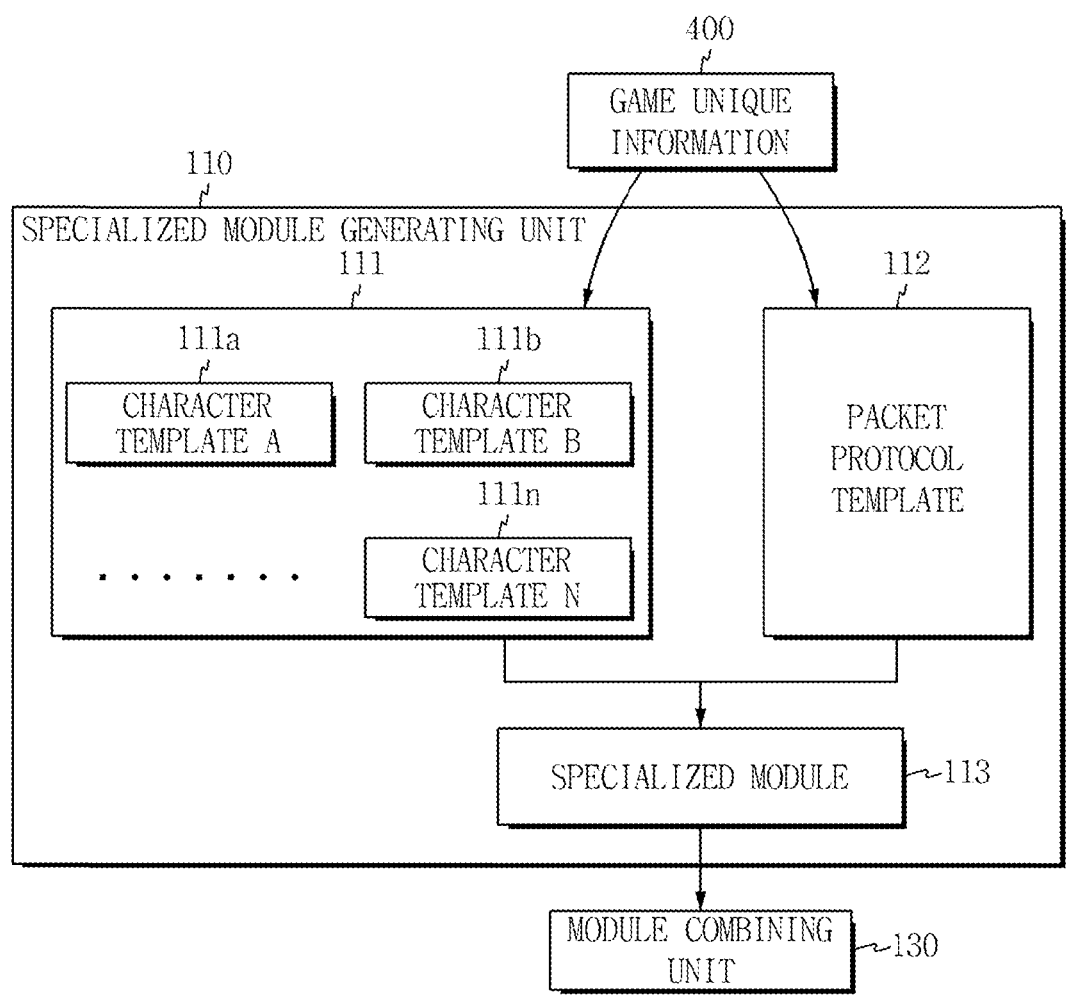
FIG. 2 is schematically showing a configuration and a function of the specialized module generating unit 110.

FIG. 2 is schematically showing a configuration and a function of the specialized module generating unit 110. The description of the repeated portion with the description of FIG. 1 will be omitted in the following description.

Referring to FIG. 2, the game unique information 400 is received by the character template 111 and the packet protocol template 112, respectively, that are stored in the specialized module generating unit 110.

The specialized module generating unit 110 selects the character template corresponding to the type of the game included in the received game unique information among a plurality of character templates 111a and 111b to 111n. The expanded character module is generated by using the selected character templates as the game unique information.

The specialized module generating unit 110 generates the packet protocol module expanded by using the packet protocol template 112 as the game unique information. Thereafter, the specialized module 113 for the functions specialized for each game is generated by combining the character module and the packet protocol module.

Figure 3:
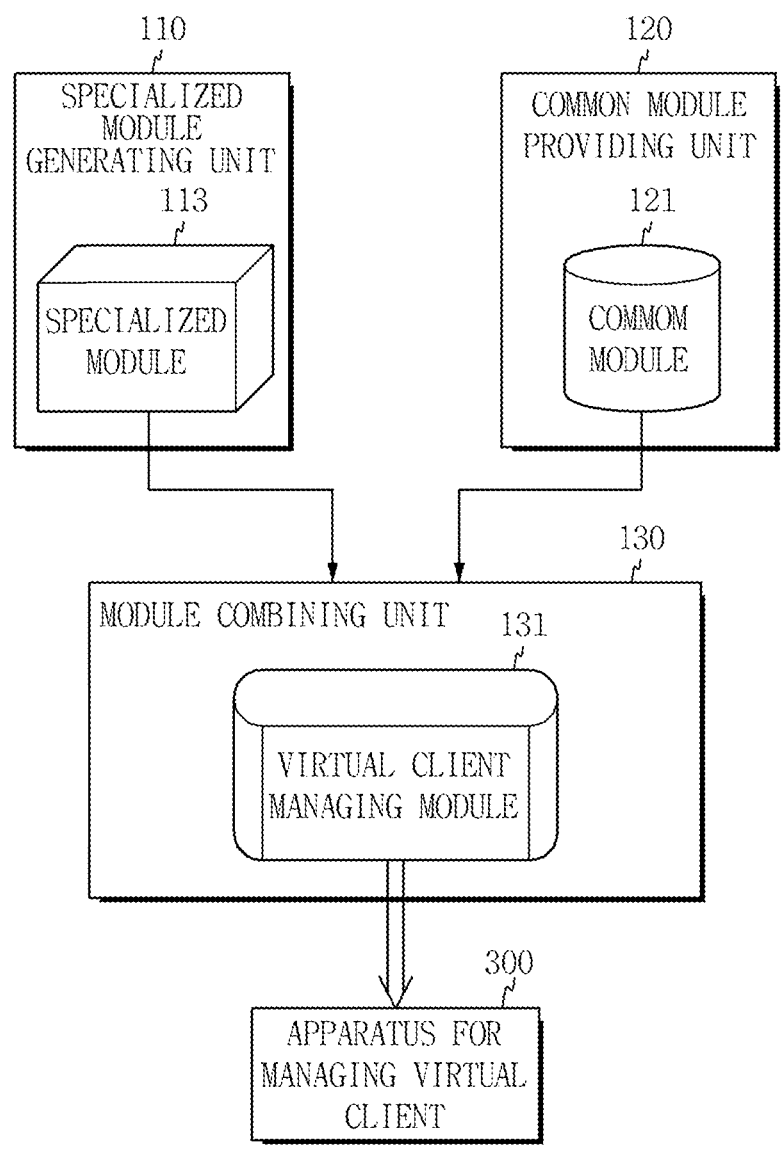
FIG. 3 schematically shows a function of the device for providing the virtual client managing module.

FIG. 3 schematically shows the function of the device for providing the virtual client managing module. The description of the repeated portion with the description of FIGS. 1 and 2 will be omitted in the following description.

Referring to FIG. 3, the specialized module generating unit 110 generates the specialized module 113 that is a module related to the functions specialized for each game by referring to the game unique information. The common module providing unit 120 provides the stored common module 121 to the module combining unit 130.

The module combining unit 130 receives the specialized module 113 and the common module 121. Thereafter, if it is determined that each module is normal, the virtual client managing module 131 is generated by combining the specialized module 113 and the common module 121. The virtual client managing module 131 is inserted into the apparatus 300 for managing the virtual client to control the operation of the apparatus 300 for managing the virtual client.

Figure 4:
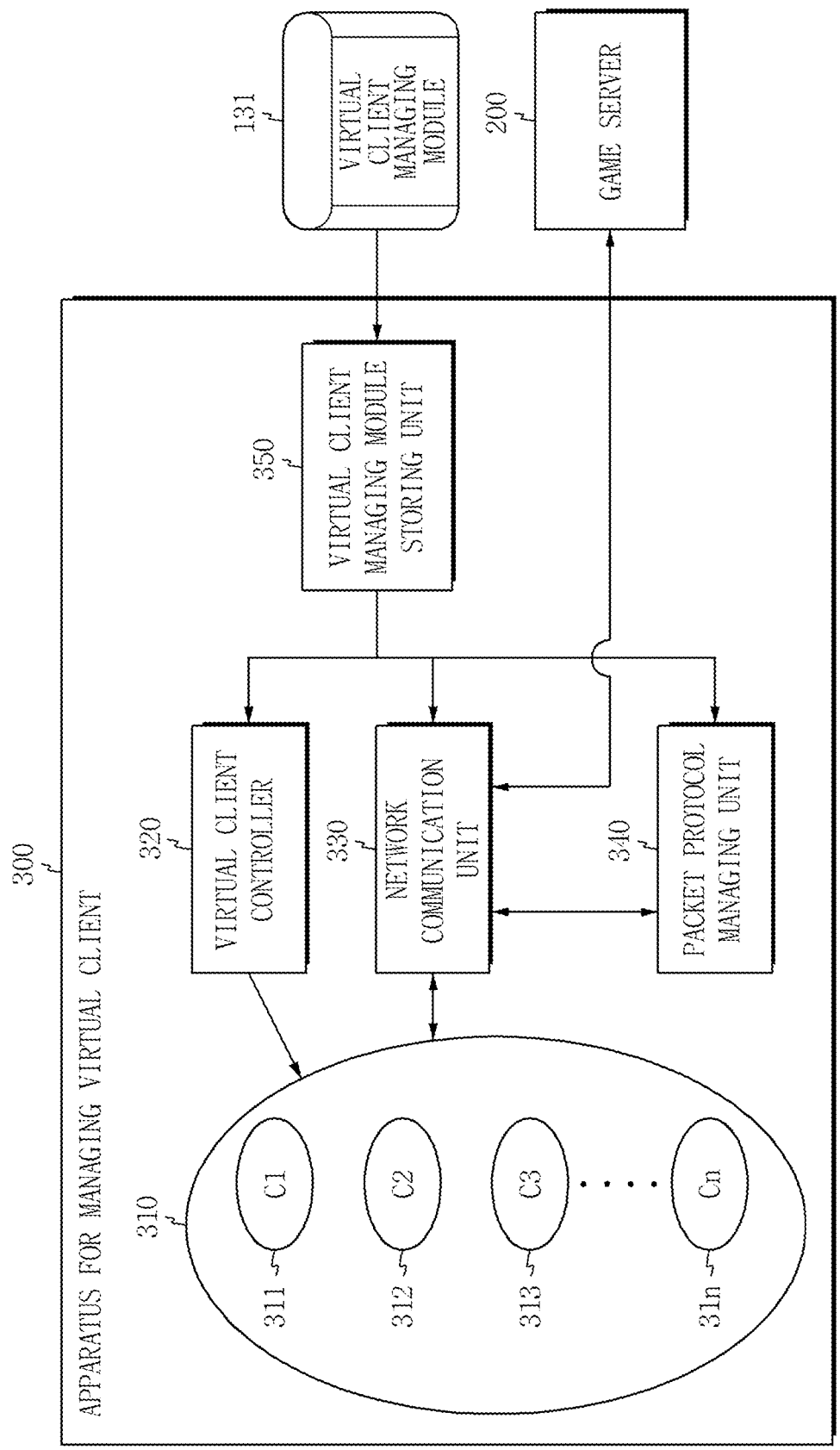
FIG. 4 is a diagram showing an apparatus for managing a virtual client according to an exemplary embodiment of the present invention.

FIG. 4 is a diagram showing the apparatus for managing the virtual client according to an exemplary embodiment of the present invention. Any repeated portions of the description with the description of FIGS. 1 to 3 will be omitted in the following description below.

Referring to FIG. 4, the apparatus 300 for managing the virtual client includes a virtual client managing module storing unit 350, a virtual client controller 320, and a network communication unit 330. In addition, the apparatus 300 for managing the virtual client may further include a packet protocol managing unit 340. The apparatus 300 for managing the virtual client may generate and manage the plurality of virtual clients 310 accessing the game server. The plurality of virtual clients 310 may also be managed in the game server 200.

The virtual client managing module storing unit 350 serves to receive and store the virtual client managing module 131 generated by combining the common module including functions commonly applied to the plurality of games and the functions specialized for each game.

The virtual client managing module storing unit 350 may serve as a key of a car. In other words, the operation of the apparatus 300 for managing the virtual client is controlled according to whether the virtual client managing module 131 exists in the virtual client managing module storing unit 350. The reason is that the virtual client can be normally generated and controlled only in the case where the virtual client managing module 131 exists in the apparatus 300 for managing the virtual client.

The virtual client managing module storing unit 350 stores the virtual client managing module 131 in which the specialized module and the common module are combined and then, provides the plurality of modules included in the virtual client managing module 131 according to a request of the plurality of components in the above-mentioned apparatus 300 of managing the virtual client so that the apparatus 300 for managing the virtual client may serve to manage the virtual client 310 based on the virtual client module 131.

The virtual client controller 320 serves to control the virtual client 310 based on the virtual client managing module 131.

The virtual client controller 320 serves to generate and control the virtual client based on the virtual client controlling module included in the virtual client managing module 131. The virtual client controlling module controls the virtual client by connecting the specialized module, the scenario application module, and the network communication module as described above. The virtual client controller 320 may include a function of managing the game specialized information and the scenario information on the virtual client and the network communication unit 330 may also include the control function.

Therefore, the behavior of the virtual client 310 is controlled by the virtual client controller 320 and the virtual client 310 serves to transmit and receive data packets between the game server 200 and each virtual clients (311, 312, 313, . . . , 31n) by commands from the virtual client controller 320.

The virtual client 310 controlled by the virtual client controller 320 may exist in plural. Further, the scenario information and the character information corresponding to each of the virtual clients (311, 312, 313, . . . , 31n) means objects to be managed by the virtual client controller.

The virtual client 310 means the virtual subject. In other words, the virtual client 310 is recognized like the general user terminal of the game in the game server 200. The reason is that the general user accesses the game server 200 to obtain the effect of transmitting and receiving the data packets to and from the game server 200 while performing various functions of a game. Therefore, the information of the virtual client 310 may be managed by the apparatus 300 for managing the virtual client.

Further, the virtual client 310 may store the character information and the scenario information. The virtual client 310 accesses the game server 200 to use a game through the characters and stores the defined scenario information and is then performed in the game.

The network communication unit 330 serves to manage the data packets transmitted and received to execute the game between the plurality of virtual clients and between the virtual client 310 and the game server 200 of the game based on the virtual client managing module.

Therefore, the network communication unit 330 is connected to each of the virtual clients (311, 312, 313, . . . , 31n) and the game server 200 to manage the data packet transmission and reception therebetween. The transmission and reception of the data packets may be performed through the network communication unit 330 according to the control for the virtual client 310 of the virtual client controller 320.

The network communication unit 330 according to another exemplary embodiment of the present invention may further include a function of generating at least one of load in a network and function error information when executing a game by generating packets related to the game and analyzing the number and contents of packets. This will be described in detail below with respect to FIG. 5.

The apparatus 300 for managing the virtual client may further include the packet protocol managing unit 340. The packet protocol managing unit 340 manages a protocol for the generation and control of the plurality of data packets transmitted and received by the network communication unit 330.

Therefore, the packet protocol managing unit 340 receives the packet protocol module included in the virtual client managing module 131 to manage the data packets in a game according to the packet protocol module. As described in the description with reference to FIG. 1, since the data packets have a different exchange order of packets, exchange related information, packet number, and configuration of packets, the packet protocol managing unit 340 manages the protocol and information on the packets to help the network communication unit 330 normally transmit and receive data packets.

Figure 5:
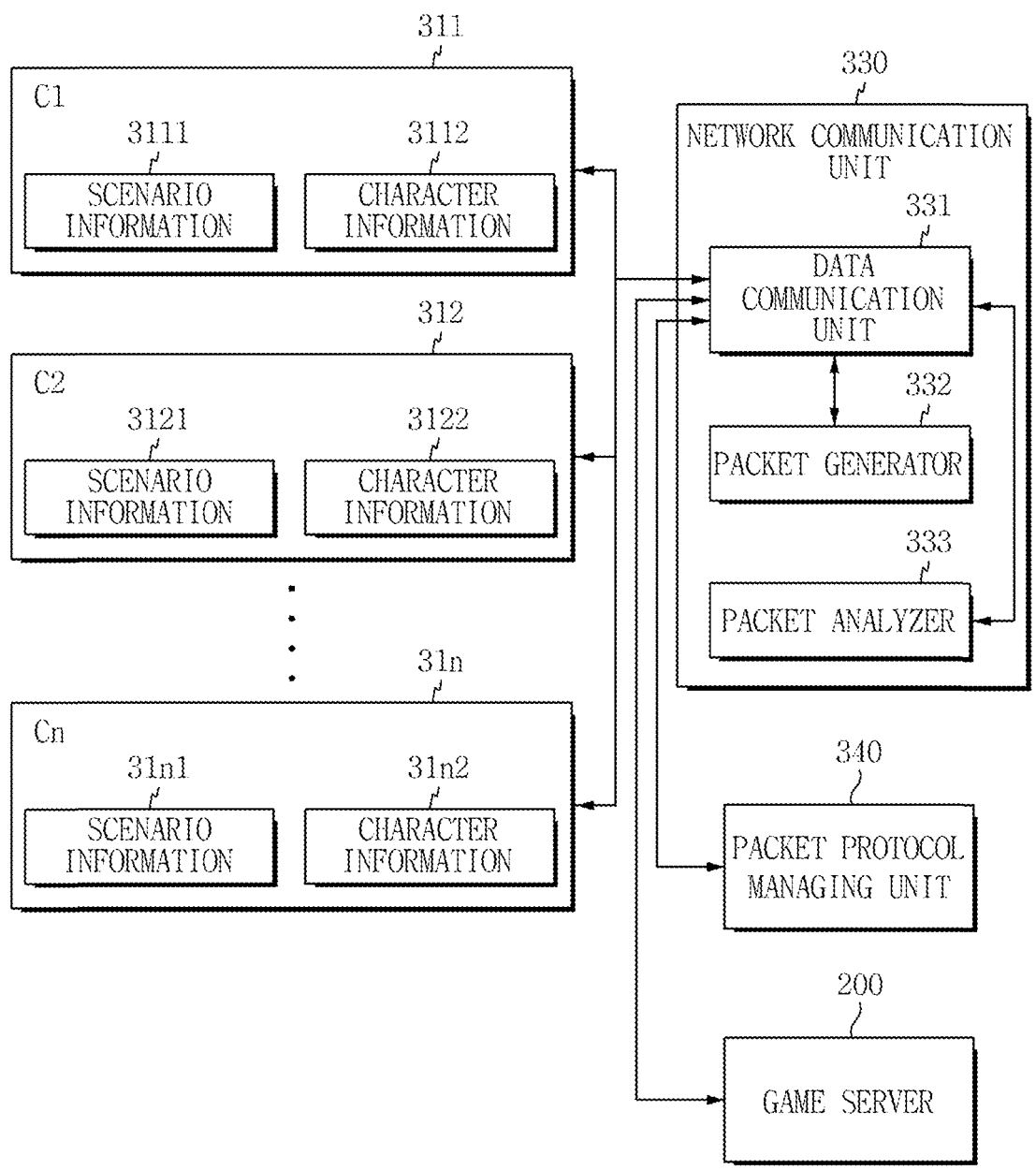
FIG. 5 shows a network communication unit of the apparatus for managing the virtual client.

FIG. 5 shows a network communication unit of the apparatus for managing the virtual client. The description of the repeated portion with the description of FIGS. 1 to 4 will be omitted in the following description.

Referring to FIG. 5, the network communication unit 330 may include a data communication apparatus 331, a packet generator 332, and a packet analyzer 333.

As described above, the data communication unit 331 performs a function of transmitting and receiving data between the plurality of virtual clients (311, 312, . . . , 31n) and the game server 220 to perform a function of controlling the data packet transmission and reception. The data communication unit 331 may be connected to the packet protocol managing unit 340 to transmit and receive the data packet based on the protocol for the data packet, that is, the protocol.

Each of the virtual clients (311, 312, ..., 31n) may include the corresponding scenario information (3111, 3121, ..., 31n1) and character information (3112, 3122, ..., 31n2).

The packet generator 332 may perform a function of generating the data packets including information generated by executing the game.

The packet generator 332 is a unit that commonly uses each of the virtual clients (311, 312, ..., 31n). In other words, each of the virtual clients (311, 312, ..., 31n) transmits information to be communicated with the game server 200 according to the game execution to the data communication unit 331 and the packet generator 332 processes the information according to the packet protocol for the game to generate the data packet.

Of course, the function of the packet generator 332 may be shared by each of the virtual clients (311, 312, ..., 31n) as described above but may generate the information of the data packet type when generating the information to be communicated with the game server 200 in each virtual client (311, 312, ..., 31n) and directly transmit the data packet to the game server 200 through the data communication unit 331.

The packet analyzer 333 analyzes the number and contents of data packets to serve to generate one or more of the load in the network and the malfunction information in executing the game.

In addition, the packet analyzer 333 analyzes the data packets to be transmitted to each of the virtual clients (311, 312, ..., 31n) to serve to generate and provide the game execution related information to be transmitted to the virtual clients (311, 312, ..., 31n).

The object of the game to be tested may largely include sensing the load in the network, that is, the load applied to the game server 200 and malfunction information when executing the game. Therefore, the packet analyzer 333 intercepts and analyzes the data packet transmitted and received through the data communication unit 331 and then, can analyze the number, that is, amount of transmitted and received data packets and the contents of data packets.

If the number of data packets is analyzed, the load applied to the network may be measured and the load applied to the game server 200 may be measured by measuring the load applied to the network. Therefore, the apparatus 300 for managing the virtual client measures the load applied to the game server 200. The load applied to the game server 200 may be measured through the network apparatus of the game server 200.

In addition, if the contents of the data packets are analyzed, a game execution related malfunction may be sensed. Of course, the game execution related malfunction may also be confirmed in the game server 200.

The data communication unit 331, the packet generator 332, and the packet analyzer 333 are connected to the packet protocol managing unit 340, thereby making it possible to generate, transmit and receive, and analyze the data packets according to the protocol for each game for data packets.

Figure 6:
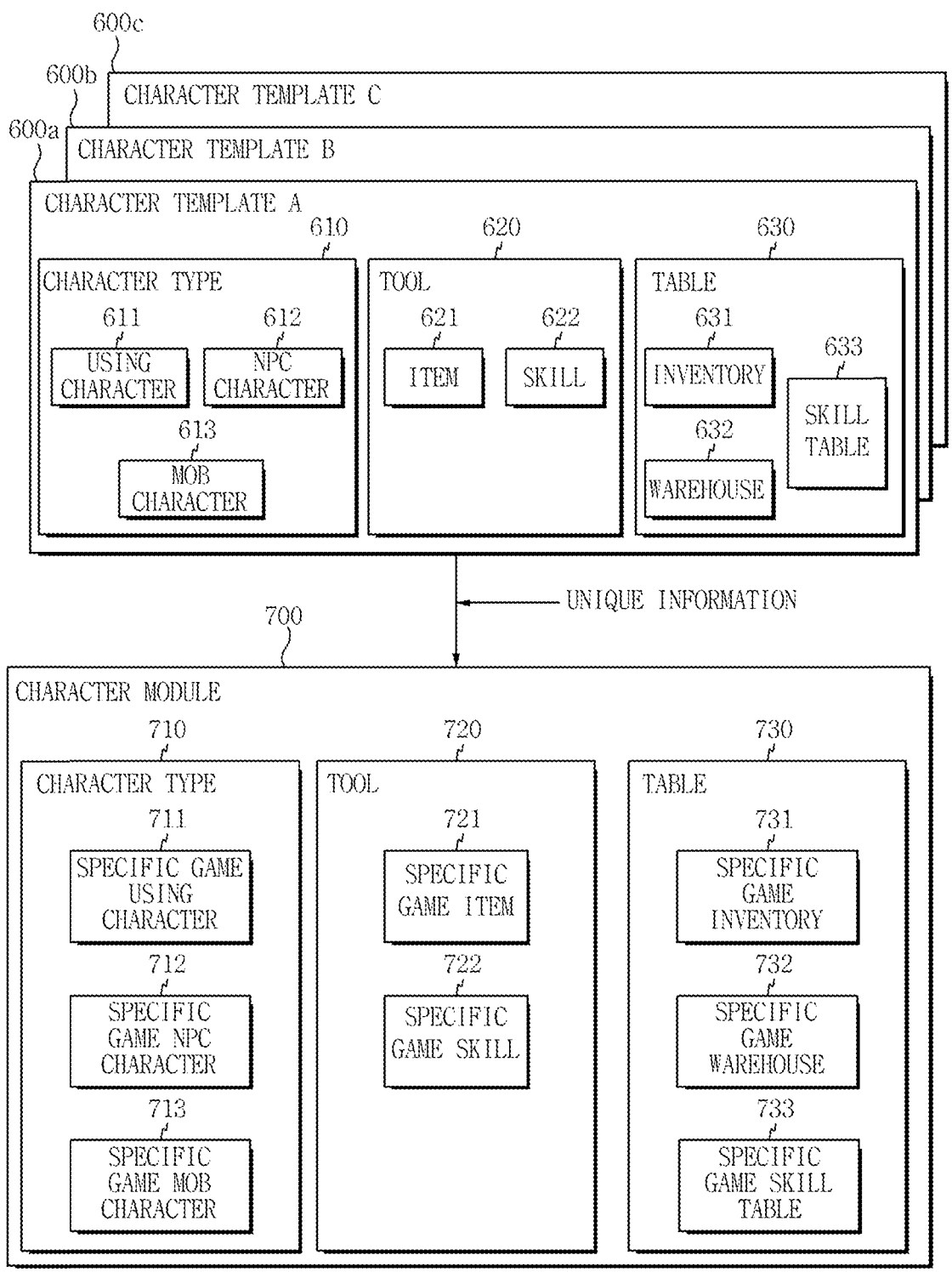
FIG. 6 shows an example of generating a character module specified for each game by combining character templates with unique information.

FIG. 6 shows an example of generating a character module specified for each game by combining character templates with unique information; and the description of the repeated portion with the description of FIGS. 1 to 5 will be omitted in the following description.

Referring to FIG. 6, character templates 600a, 600b, and 600c classified for each type of games may exist in the specialized module generating unit 110. The character template 111 of FIG. 2 and the character templates 600a, 600b, and 600c of FIG. 6 mean the same template.

Among the character templates 600a, 600b, and 600c, it is assumed that the character template 600a of which the game type is a roll playing game is selected to generate the virtual client managing module 131.

The character template 600a may include a character type 610, tool 620, and table 640 template.

The character type 610 template may include the template that may form the used character 611 that is to be used by generating the virtual client, an NPC character 612 that is a character naturally existing in the game, and a mob character 613 to be hunted by charging the character.

The tool 620 template may include the template that generates an item 621 and a skill 622 to be used by the character.

The table 630 template may include the template that can generate an inventory 631 storing an item, a warehouse 632 independently storing the item in the character, and a skill table 633 storing information on the skill, acquisition conditions, effect, etc.

The type of template that may be included in the character template 600a of the type of above-mentioned roll playing games is only the example and may include the template for other information or added information according to the types of games.

The game server 200 or the user including the game manager input only the game unique information to the specialized module generating unit 110 without needing to select the character template 600a. The specialized module generating unit 110 analyzes the unique information of the input game to classify the types of games and selects the character template 600a based on the types of games determined as a result of analyzing the game unique information.

When the character template 600a is selected, the specialized module generating unit 110 uses the game unique information to generate a character module 700 expanding the character template 600a.

The generated character module 700 may include the information corresponding to the character template 600. First, it may include the data of the character type 710. The character type 711 may include a specific game using character 711 (for example, transferring, wizard, magician, etc.), a specific game NPC character 712 (for example, merchant, skill master, guild manager, warehouse keeper, etc.), and a specific game mob character 713 (for example, human type mob, animal type mob, etc.).

It may include data related to a tool 720. The tool 720 may include a specific game item 721 (for example, sword, bow, arrow, medicine, jewelry, etc.) and a specific game skill 722 (for example, continuous mowing, fireball, ice arrow, etc.). It may include a table 730 data.

The table 730 may include a specific game inventory 731 (name and standard of inventory, for example, bag having 16 compartments), a specific game warehouse 732 (name and standard of warehouse, for example, warehouse having 100 compartments), and a specific game skill table 733 (for example, transferring skill table, wizard skill table, etc.).

Figure 7:
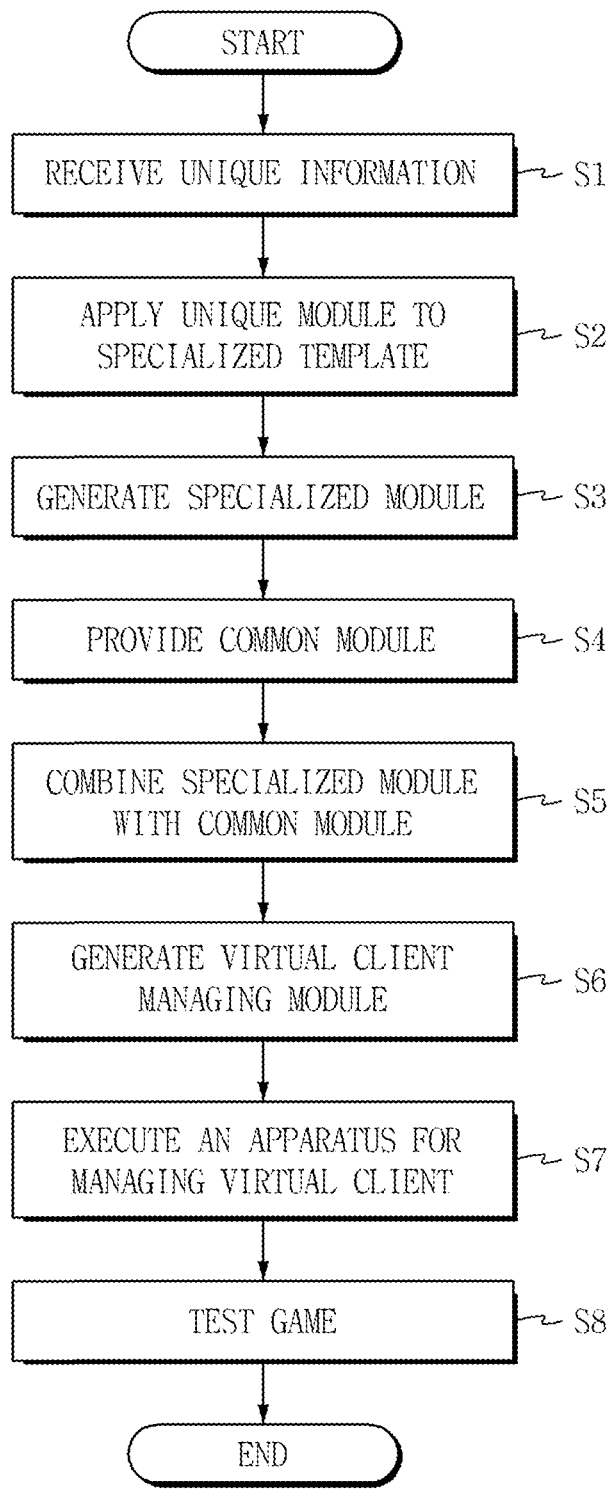
FIG. 7 is a flow chart showing a method for testing a game by using a virtual client managing module according to an exemplary embodiment of the present invention.

FIG. 7 is a flow chart showing a method for testing a game by using a virtual client managing module according to an exemplary embodiment of the present invention. The description of the repeated portion with the description of FIGS. 1 to 6 will be omitted in the following description.

Referring to FIG. 7, the method for testing a game by using the virtual client managing module according to the exemplary embodiment of the present invention performs a step of generating specified module 113 which expands a specified templates 111 and 112 classified for a type of games by using game unique information 400 by the specialized module generating unit 110. The step of generating the specialized module 113 may include receiving the game unique information from the game server 200 or the user (S1), expanding the specialized templates 111 and 112 by applying the game unique information 400 to the specialized templates 111 and 112 (S2), and generating the specialized module 113 by combining the character specialized module and the packet protocol module (S3).

Thereafter, the common module providing unit 120 performs a step of providing the common module 121 including the function common to the plurality of games (S4). To this end, the common module 121 may be stored in the common module providing unit 120.

When the specialized module 113 is generated and the common module 121 is provided, the module combining unit 130 performs steps of generating the virtual client managing module 131 of the specific game by combining the specialized module 113 and the common module 121 (S5 and S6). Step S6 may mean a step of combining the specific module 113 and the common module 121 and packaging them.

Thereafter, the apparatus 300 for managing the virtual client may perform steps that virtually execute and test the game based on the virtual client managing module 131 (S7 and S8). The testing step may include a step of receiving the virtual client managing module 131 by the apparatus 300 for managing the virtual client (S7) and a step of executing and testing the game by the apparatus 300 for managing the virtual client after step S7 (S8).

In detail, step S7 may include a step of controlling the virtual client 310 based on the virtual client managing module 131 by the virtual client controller 320 and a step of managing data packets exchanged to execute the game between the plurality of virtual clients 310 and between the virtual client 310 and the game server 200 of the game based on the virtual client managing module 131 by the network communication unit 330.

The step 310 of controlling the virtual client may be a step that performs at least one of the generation, removal, and control of the virtual client 310 based on at least one of the virtual client control module 131, the character module 700, the packet protocol module, and the scenario application module.

The step of managing the data packet may include a step that generates the data packets including the information generated by executing the game by the packet generator 332. When the packet generator 332 receives the information to be transmitted and received by executing the game from the virtual client 310, the step of generating the data packets may be a step of generating the data packets from the information based on the protocol of the data packets stored in the packet protocol managing unit 340.

In addition, the step of managing the data packet may include a step of generating at least one of the load in the network and the malfunction information when executing the game by analyzing the number and contents of data packets by the packet analyzer 333.

When the packet analyzer 333 transmits and receives the information necessary to execute the game in a data packet type, the step of managing the data packets may further include a step of analyzing the data packets to control the virtual client 310 based on the transmitted and received information to extract the information necessary to execute the game.

The description of the device 100 for providing the virtual client managing module, the apparatus 300 for managing the virtual client, and the method for testing the game by using the virtual client managing module according to the exemplary embodiment of the present invention is not limited to the scope of the appended claims. Further, in addition to the foregoing exemplary embodiments, the equivalent inventions performing the same function as the present invention should be construed as being included in the scope of the present invention.

What is claimed is:

1. A device for providing a virtual client managing module, the device comprising:
    a specialized module generating unit configured to generate a specialized module expanded from a specialized template by using game unique information, said specialized template being classified for each type of games;
    a common module providing unit configured to provide a common module including functions common to a plurality of games; and
    a module combining unit configured to generate the virtual client managing module of a game by combining the specialized module and the common module, wherein the virtual client managing module is configured to test the game by managing a virtual client,
    wherein the common module includes a virtual client control module that is related with generation and control of the virtual client, and
    wherein the common module includes a scenario application module defining a series of behaviors of the virtual client.

2. The device of claim 1, wherein the specialized template includes a packet protocol template,
    wherein the specialized module includes a packet protocol module, and
    wherein the specialized module generating unit is configured to generate the packet protocol module using the packet protocol template.

3. The device of claim 2, wherein the packet protocol template includes a template regarding at least one among exchanging order of a packet exchanged between a game client and a game server, a packet exchanging information, the number of the packet, and a configuration information of the packet.

4. The device of claim 1, wherein the common module includes a network communication module that controls communication between the virtual client and a game server.

5. An apparatus for managing a virtual client, the apparatus comprising:
    a virtual client managing module storing unit configured to receive and store a virtual client managing module generated by combining a common module having a function commonly applied to a plurality of games and a specialized module having functions specialized for a specific game, wherein the virtual client managing module is configured to test the specific game by managing the virtual client;
    a virtual client controller configured to control the virtual client based on the virtual client managing module; and
    a network communication unit configured to manage data packets exchanged between the virtual client and a game server of the specific game for executing the specific game based on the virtual client managing module,
    wherein the common module includes a virtual client control module that is related to generation and control of a virtual client, and
    wherein the common module includes a scenario application module that defines a series of behaviors of the virtual client.

6. The apparatus for managing a virtual client according to claim 5, wherein the network communication unit includes:

a packet generator configured to generate data packets including the information generated by executing the specific game; and a packet analyzer configured to analyze the number and contents of data packets to generate at least one of a load in a network and a malfunction information when executing the specific game.

7. The apparatus for managing a virtual client according to claim 5, wherein the specialized module includes a packet protocol module for the specific game, and wherein the packet protocol module is a module generated using a packet protocol template.

8. The apparatus for managing a virtual client according to claim 5, wherein the common module includes a network communication module that controls communication between the virtual client and the game server.

9. The apparatus for managing a virtual client according to claim 5, wherein the virtual client exists in plural and is a subject that manages a scenario information and a character information corresponding to each virtual client according to the control of the virtual client controller.

10. The apparatus for managing a virtual client according to claim 7, further comprising a packet protocol managing unit configured to manage, using the packet protocol module, a protocol for generation and control of a plurality of the data packets.

11. A method for testing a game by using a virtual client managing module, comprising:

generating, by a specialized module generating unit, a specialized module expanded from a specialized template by using game unique information, the specialized template classified for each type of games;

providing a common module including functions common to a plurality of games by a common module providing unit; and generating a virtual client managing module of the game by combining the specialized module and the common module by a module combining unit, wherein the virtual client managing module is configured to test the game by managing a virtual client, wherein the common module includes a virtual client control module that is related to generation and control of a virtual client, and wherein the common module includes a scenario application module that defines a series of behaviors of the virtual client.

12. The method for testing a game by using a virtual client managing module according to claim 11, wherein the specialized template includes a packet protocol template, wherein the specialized module includes a packet protocol module, and wherein generating, by the specialized module generating unit, the specialized module includes generating the packet protocol module using the packet protocol template.

13. The method for testing a game by using a virtual client managing module according to claim 12, wherein the packet protocol template includes a template regarding at least one among exchanging order of a packet exchanged between a game client and a game server, an packet exchanging information, the number of the packet, and a configuration information of the packet.

14. The method for testing a game by using a virtual client managing module according to claim 11, wherein the common module includes a network communication module that controls communication between the virtual client and a game server.

15. The method for testing a game by using a virtual client managing module according to claim 11, further comprising virtually executing and testing the game based on the virtual client managing module by an apparatus for managing the virtual client.

16. The method for testing a game by using a virtual client managing module according to claim 15, wherein the testing includes controlling the virtual client based on the virtual client managing module by a virtual client controller.

17. The method for testing a game by using a virtual client managing module according to claim 16, wherein the controlling the virtual client is performing at least one of the generation, removal, and control of the virtual client based on at least one of a virtual client control module, a character module, a packet protocol module, and a scenario application module.

18. The method for testing a game by using a virtual client managing module according to claim 17, wherein the virtual client exists in plural and is a subject that manages a scenario information and a character information corresponding to each virtual client by using the scenario application module and the character module.

19. The method for testing a game by using a virtual client managing module according to claim 15, wherein the testing the game includes managing data packets exchanged between the virtual client and a game server of the game for executing the game based on the virtual client managing module by a network communication unit.

20. The method for testing a game by using a virtual client managing module according to claim 19, wherein the managing the data packets includes generating data packets including an information generated by executing the game by a packet generator; and analyzing the number and contents of data packets by a packet analyzer to generate at least one of a load in a network and a malfunction information when executing the game.

* * * * *